United States Patent
Shinoda et al.

(10) Patent No.: US 10,927,316 B2
(45) Date of Patent: Feb. 23, 2021

(54) CHAR DISCHARGE UNIT, CHAR RECOVERY UNIT INCLUDING CHAR DISCHARGE UNIT, CHAR DISCHARGE METHOD, AND INTEGRATED GASIFICATION COMBINED CYCLE

(71) Applicant: MITSUBISHI HITACHI POWER SYSTEMS, LTD., Yokohama (JP)

(72) Inventors: Haruto Shinoda, Kanagawa (JP); Koji Nishimura, Kanagawa (JP); Naoto Nakayama, Kanagawa (JP); Yasunari Shibata, Kanagawa (JP)

(73) Assignee: MITSUBISHI POWER, LTD, Yokohama (JP)

( * ) Notice: Subject to any disclaimer, the term of this patent is extended or adjusted under 35 U.S.C. 154(b) by 434 days.

(21) Appl. No.: 16/062,808

(22) PCT Filed: Dec. 12, 2016

(86) PCT No.: PCT/JP2016/086935
§ 371 (c)(1),
(2) Date: Jun. 15, 2018

(87) PCT Pub. No.: WO2017/104620
PCT Pub. Date: Jun. 22, 2017

(65) Prior Publication Data
US 2020/0263101 A1 Aug. 20, 2020

(30) Foreign Application Priority Data
Dec. 18, 2015 (JP) .............................. JP2015-247865

(51) Int. Cl.
*C10J 3/84* (2006.01)
*C10J 3/46* (2006.01)
(Continued)

(52) U.S. Cl.
CPC . *C10J 3/84* (2013.01); *C10J 3/46* (2013.01); *C10J 3/723* (2013.01); *F02C 3/20* (2013.01);
(Continued)

(58) Field of Classification Search
CPC ......................................................... C10J 3/84
See application file for complete search history.

(56) References Cited

U.S. PATENT DOCUMENTS 3,963,426 A * 6/1976 Hand ..................... C10J 3/466
48/197 R
4,838,898 A * 6/1989 Mifflin ..................... C10J 3/466
110/165 A
(Continued)

FOREIGN PATENT DOCUMENTS

JP 61-218692 A 9/1986
JP 11-106761 A 4/1999
(Continued)

OTHER PUBLICATIONS

International Search Report dated Jan. 17, 2017, issued in counterpart application No. PCT/JP2016/086935. (2 pages).
(Continued)

*Primary Examiner* — Matthew J Merkling
(74) *Attorney, Agent, or Firm* — Westerman, Hattori, Daniels & Adrian, LLP (57) ABSTRACT

A char discharge unit is for discharging char discharged from a filtration unit into a char storage unit in which a pressure is at least temporarily higher pressure than that in the filtration unit. The char discharge unit includes a char discharge line connected to a lower side of the filtration unit in a vertical direction and connected to the char storage unit; a lock hopper installed at an intermediary point of the char discharge line to temporarily store the char; an admission valve installed in the char discharge line between the lock (Continued)

hopper and the filtration unit; a control valve installed in the char discharge line between the lock hopper and the char storage unit; and a control device configured to close the control valve when the admission valve is open, and to close the admission valve when the control valve is open.

6 Claims, 4 Drawing Sheets

(51) Int. Cl.
    *C10J 3/72*     (2006.01)
    *F02C 3/20*     (2006.01)

(52) U.S. Cl.
    CPC .................. *C10J 2300/1637* (2013.01); *C10J 2300/1675* (2013.01)

(56) References Cited

U.S. PATENT DOCUMENTS

| | | | |
|---|---|---|---|
| 5,143,521 A * | 9/1992 | Dewitz | C10J 3/466 48/210 |
| 5,232,466 A * | 8/1993 | Dewitz | C10J 3/466 48/77 |
| 5,401,282 A * | 3/1995 | Leininger | C10J 3/06 48/197 R |
| 7,842,108 B2 * | 11/2010 | Holle | C10J 3/845 48/61 |
| 2008/0115479 A1 * | 5/2008 | Tamura | C10K 1/101 60/39.12 |
| 2008/0163548 A1 * | 7/2008 | Shinada | C10J 3/00 48/77 |
| 2011/0147666 A1 | 6/2011 | Troxclair | |
| 2013/0140168 A1 * | 6/2013 | Koyama | B01J 8/0025 202/261 |
| 2014/0231239 A1 * | 8/2014 | Koyama | B65G 53/18 202/261 |
| 2017/0260465 A1 * | 9/2017 | Soda | C10J 3/46 |
| 2020/0080011 A1 * | 3/2020 | Blythe | C10J 3/84 |

FOREIGN PATENT DOCUMENTS

| | | |
|---|---|---|
| JP | 11-116971 A | 4/1999 |
| JP | 2011-012146 A | 1/2011 |
| JP | 2012-046572 A | 3/2012 |

OTHER PUBLICATIONS

Written Opinion dated Jan. 17, 2017, issued in counterpart application No. PCT/JP2016/086935, with English translation. (10 pages).

* cited by examiner

CHAR DISCHARGE UNIT, CHAR RECOVERY UNIT INCLUDING CHAR DISCHARGE UNIT, CHAR DISCHARGE METHOD, AND INTEGRATED GASIFICATION COMBINED CYCLE

FIELD

The present invention relates to a char discharge unit that discharges char collected with a filtration unit into a char storage unit, a char recovery unit including such a char discharge unit, a char discharge method, and an integrated gasification combined cycle.

BACKGROUND

A known example of a gasification unit that gasifies carbonaceous feedstock, such as coal, includes a carbonized-fuel gasification unit (coal gasification unit) that produces combustible gas by supplying the carbonaceous feedstock into a gasifier, and allowing the fuel to undergo a partial combustion. In such a gasification unit, combustible gas produced in the gasifier contains unreacted part of and ash of the carbonaceous feedstock such as coal (hereinafter, referred to as "char"). Therefore, the gasification unit is provided with a char recovery unit that includes a precipitator for collecting char, a char storage unit that stores therein the char collected with the precipitator, and a channel for returning the char stored in the char storage unit into the gasifier on the downstream side.

Patent Literature 1 discloses a structure including a cyclone that collects char using centrifugation, and a filter that collects char with a filter material (filter), as a precipitator. The apparatus disclosed in Patent Literature 1 also includes a rotary valve that is provided to a channel for feeding the char collected with the filter into a char bin that is a part of the char storage unit.

CITATION LIST

Patent Literature

Patent Literature 1: Japanese Patent Application Laid-open No. 2012-46572

SUMMARY

Technical Problem

In the char recovery apparatus disclosed in Patent Literature 1, because the rotary valve is disposed between the filter and the char bin, even in an inverted pressure balance in which the pressure in the char bin is higher than that in the filter, char can be discharged from the filter into the char bin while suppressing flowback of the char collected with the cyclone, which is a primary precipitator, through the char bin into the filter. In the char recovery apparatus disclosed in Patent Literature 1 using such a rotary valve between the filter and the char bin, however, because the rotary valve has a constantly sliding portion, the sealability of the constantly sliding portion becomes reduced, disadvantageously. When the sealability becomes reduced, leakage of internal fluid might occur. Because the internal fluid is combustible and poisonous gas, frequent repairing (maintenance) prior to the leakage of the internal fluid may be required.

To address this issue, an object of the present invention is to provide a char discharge unit capable of discharging char reliably from a filtration unit into a char storage unit even in an inverted pressure balance in which the pressure in the char storage unit is higher than that in the filtration unit, and of reducing the frequency of maintenance, and to provide a char recovery unit including such a char discharge unit and a char discharge method.

Solution to Problem

To solve the problem described above, a char discharge unit is for discharging char discharged from a filtration unit into a char storage unit in which a pressure is at least temporarily higher pressure than that in the filtration unit. The char discharge unit includes a char discharge line connected to a lower side of the filtration unit in a vertical direction and connected to the char storage unit; a lock hopper installed at an intermediary point of the char discharge line to temporarily store the char; an admission valve installed in the char discharge line between the lock hopper and the filtration unit; a control valve installed in the char discharge line between the lock hopper and the char storage unit; and a control device configured to close the control valve when the admission valve is open, and to close the admission valve when the control valve is open.

With such a char discharge unit, because the lock hopper is provided to the char discharge line, the admission valve is provided to the char discharge line on the side of the filtration unit with respect to the lock hopper, and the control valve is provided to the char discharge line on the side of the char storage unit with respect to the lock hopper, a structure without any constantly sliding sealing portion can be achieved. Such a structure can discharge char while maintaining the sealability between the filtration unit and the char storage unit. In this manner, the frequency of maintenance can be reduced.

The lock hopper is preferably disposed above the char storage unit in the vertical direction. A part of the char discharge line connecting the lock hopper and the char storage unit is preferably laid in an orientation allowing the char to fall from the lock hopper into the char storage unit due to gravity.

By using the structure described above, the lock hopper can discharge the discharged char into the char bin by allowing the char to fall due to the gravitational force. In this manner, the char collected with the filtration unit that is the secondary precipitator and having a relatively small powder diameter can be efficiently transported into the char bin. Because the small diameter char stored in the lock hopper does not fluidize very easily, the char can be transported more efficiently by transporting the char using the gravitational force as disclosed in the embodiment, comparing with a structure in which the char is transported by setting a higher pressure to the lock hopper than that in the char bin, and using air transportation using the pressure difference, as in the supply hopper, for example.

The char discharge unit preferably includes an inert gas supplying unit configured to supply inert gas into the lock hopper. It is also preferable that to start discharging of the char from the lock hopper into the char storage unit, the control device closes the control valve and the admission valve and causes the inert gas supplying unit to supply inert gas into the lock hopper so that a pressure inside the lock hopper becomes a same level as a pressure inside the char storage unit, and then opens the control valve.

In such a char discharge unit, after the char is completely discharged from the filtration unit into the lock hopper, and before the char is started being supplied from the lock hopper into the char storage unit, the nitrogen supplying unit is caused to supply nitrogen into the lock hopper so that the pressure in the lock hopper is increased to the same pressure as that in the char bin. Therefore, generation of a gas flow in a direction from the char bin toward the lock hopper can be suppressed.

The control valve preferably includes a gate valve configured to switch between starting and stopping a flow of the char through the char discharge line; and a dispensing valve disposed closer to the char storage unit than the gate valve to switch sealing gas inside the char discharge line.

With such a char discharge unit, because the control valve includes two valves, the flow of the char and the sealability can be controlled using separate valves.

It is preferable that to start discharging of the char from the lock hopper into the char storage unit, the control device opens the dispensing valve and then opens the gate valve, and to stop discharging of the char from the lock hopper into the char storage unit, the control device closes the gate valve and then closes the dispensing valve.

In such a char discharge unit, the dispensing valve and the gate valve are switched to open and to close in the order described above. Therefore, the dispensing valve for controlling gas flow can be closed in a condition where there is no char around the dispensing valve. In this manner, it is possible to inhibit the char from attaching to the dispensing valve that is for ensuring the sealability, and to suppress the reduction of the sealability of the dispensing valve. Therefore, higher sealability can be maintained.

To solve the problem described above, a char recovery unit includes a cyclone configured to separate at least a part of char from combustible gas produced in a gasification unit; a filtration unit configured to collect the char contained in the combustible gas having passed through the cyclone; a char storage unit configured to store the char collected with the cyclone and the filtration unit; any one of the char discharge units described above to discharge the char collected with the filtration unit into the char storage unit; and a char return line for supplying the char stored in the char storage unit into the gasification unit.

Because the char recovery unit is provided with the char discharge unit, char can be discharged stably from the filtration unit into the char storage unit. In this manner, the frequency of maintenance can be reduced.

To solve the problem described above, a char discharge method is of discharging char discharged from a filtration unit into a char storage unit in which a pressure is at least temporarily higher than that in the filtration unit. The char discharging method includes the steps of opening an admission valve that is installed in an intermediary point of a char discharge line connected to a lower side of the filtration unit in a vertical direction and connected to the char storage unit; temporarily storing the char in a lock hopper that is installed downstream of the admission valve in the char discharge line; closing the admission valve; increasing a pressure inside the lock hopper; and opening a control valve that is installed downstream of the lock hopper in the char discharge line to discharge the char from the lock hopper into the char storage unit.

In this char discharge method, the lock hopper is provided to the char discharge line, the admission valve is provided to the char discharge line on the side of the filtration unit with respect to the lock hopper, and the control valve is provided to the char discharge line on the side of the char storage unit with respect to the lock hopper, and the admission valve and the control valve are switched in such a manner that one of the admission valve and the control valve is opened while the other is closed. In this manner, the char can be discharged while achieving a structure without any constantly sliding sealing portion. Therefore, the char can be discharged while maintaining the sealability between the filtration unit and the char storage unit. In this manner, the frequency of maintenance can be reduced.

An integrated gasification combined cycle includes a gasification unit configured to combust and gasify carbonaceous feedstock to produce raw syngas; the char recovery unit to recover char from combustible gas discharged from the gasification unit; a gas turbine configured to be driven in rotation by combusting at least a part of the combustible gas produced by the gasification unit and having passed through the char recovery unit; a steam turbine configured to be driven in rotation by steam produced by a heat recovery steam generator into which turbine flue gas discharged from the gas turbine is introduced; and a generator coupled to the gas turbine and the steam turbine.

Advantageous Effects of Invention

According to the present invention, char can be discharged stably from a filtration unit into a char storage unit in an inverted pressure balance, in which the pressure in the char storage unit is higher than that of the filtration unit, and the frequency of maintenance can be reduced.

DESCRIPTION OF EMBODIMENTS

An embodiment according to the present invention will now be explained in detail with reference to some drawings. The embodiment is, however, not intended to limit the scope of the present invention in any way. Elements described in the embodiment include those that can be easily replaced by those skilled in the art, or those that are substantially the same. The elements described below may be combined as appropriate. When there are a plurality of embodiments, the embodiments may also be combined.

Figure 1:
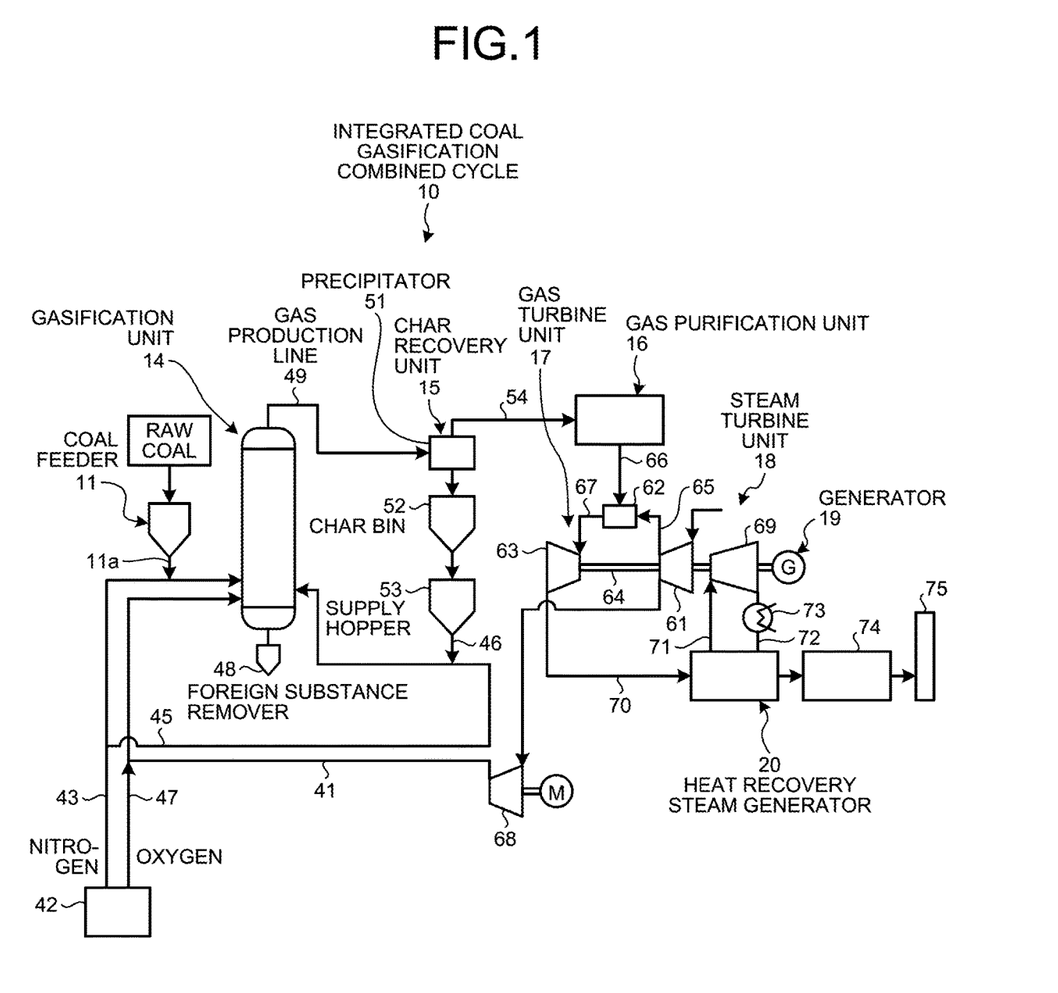
FIG. 1 is a schematic of a general configuration of an integrated coal gasification combined cycle including a char recovery unit according to one embodiment.

FIG. 1 is a schematic of a general configuration of an integrated coal gasification combined cycle including a char recovery unit according to the embodiment. The integrated coal gasification combined cycle (IGCC) power plant 10 using a gasification unit according to the embodiment uses the air as oxygen containing gas. A gasification unit 14 uses an air-combustion technique in which combustible gas is produced from a fuel. In the integrated coal gasification combined cycle 10, a gas purification unit purifies the combustible gas produced in the gasification unit 14 into fuel gas, and the fuel gas is supplied into a gas turbine unit that generates power. In other words, the integrated coal gasification combined cycle 10 according to the embodiment is a power plant using the air-combustion (air-blown) technique. Carbonaceous feedstock such as coal is used as the fuel to be supplied to the gasification unit 14.

The integrated coal gasification combined cycle (integrated gasification combined cycle) 10 includes, as illustrated in FIG. 1, a coal feeder 11, a gasification unit 14, a char recovery unit 15, a gas purification unit 16, a gas turbine unit 17, a steam turbine unit 18, a generator 19, and a heat recovery steam generator (HRSG) 20.

The coal feeder 11 is supplied with coal that is carbonaceous feedstock as a raw coal, and mills the coal with a coal mill (not illustrated) or the like to produce pulverized coal that is coal milled into fine powder. The pulverized coal produced in the coal feeder 11 is carried by nitrogen, which is a carrier inert gas supplied by an air separator 42 described later, and is supplied into the gasification unit 14. The inert gas is inert gas containing oxygen of approximately 5% by volume or less. Typical examples of the inert gas include nitrogen gas, carbon-dioxide gas, and argon gas, but the oxygen content is not necessarily limited to approximately 5% by volume or less.

The gasification unit 14 has a two-stage entrained bed gasifier, for example. The gasification unit 14 gasifies the coal (pulverized coal) supplied thereto, by allowing the coal to undergo a partial combustion with oxygen containing gas (air, oxygen) to produce raw syngas. The gasification unit 14 is provided with a foreign substance remover 48 for removing dust or foreign substances mixed in the pulverized coal. The gasification unit 14 may be a fluid bed gasifier or a fixed bed gasifier, without limitation to the entrained bed gasifier. A gas production line 49 for supplying combustible gas into the char recovery unit 15 is connected to the gasification unit 14 so that the combustible gas containing char can be discharged. In such a configuration, a gas cooler may be provided to the gas production line 49 so that the combustible gas cooled to a predetermined temperature is supplied into the char recovery unit 15.

A compressed air feeding line 41 extending from the gas turbine unit 17 (compressor 61) is connected to the gasification unit 14, so that the compressed air compressed in the gas turbine unit 17 can be supplied to the gasification unit 14. The air separator 42 separates the air to produce nitrogen and oxygen from the air in the atmosphere, and the air separator 42 is connected to the gasification unit 14 via a first nitrogen feeding line 43. A coal feeding line 11a from the coal feeder 11 is connected to the first nitrogen feeding line 43. A second nitrogen feeding line 45 branched out from the first nitrogen feeding line 43 is also connected to the gasification unit 14, and a char return line 46 from the char recovery unit 15 is connected to the second nitrogen feeding line 45. The air separator 42 is also connected to the compressed air feeding line 41 via an oxygen feeding line 47. The nitrogen separated in the air separator 42 flows through the first nitrogen feeding line 43 and the second nitrogen feeding line 45, and is used as carrier gas for carrying coal or char. The oxygen separated in the air separator 42 flows through the oxygen feeding line 47 and the compressed air feeding line 41, and is used as oxygen containing gas in the gasification unit 14.

The char recovery unit 15 includes the char return line 46, a precipitator 51, a char bin (char storage unit) 52, and a supply hopper 53. The precipitator 51 separates the char contained in the combustible gas produced in the gasification unit 14. The combustible gas having char separated is sent to the gas purification unit 16 via a gas discharge line 54. The char bin 52 stores therein the char separated from the combustible gas by the precipitator 51. The char bin 52 supplies the char stored therein to the supply hopper 53. The supply hopper 53 stores therein the char supplied from the char bin. The char return line 46 is connected to the supply hopper 53. The char return line 46 is connected to the second nitrogen feeding line 45. The char recovery unit 15 will be described later.

The gas purification unit 16 purifies gas by removing impurities such as sulfur compounds or nitrogen compounds from the combustible gas having the char separated by the char recovery unit 15. The gas purification unit 16 produces fuel gas by purifying the combustible gas, and supplies the fuel gas into the gas turbine unit 17. Because the combustible gas having the char separated still has sulfur content (e.g., H2S), the gas purification unit 16 makes effective use of the sulfur content by removing the sulfur content with amine absorbent, and eventually recovering the sulfur content as gypsum.

The gas turbine unit 17 includes a compressor 61, a combustor 62, and a turbine 63, and the compressor 61 and the turbine 63 are coupled to each other via a rotational shaft 64. A compressed air feeding line 65 from the compressor 61 and a fuel gas feeding line 66 from the gas purification unit 16 are connected to the combustor 62. A combustion gas feeding line 67 extending toward the turbine 63 is also connected to the combustor 62. The gas turbine unit 17 is provided with the compressed air feeding line 41 extending from the compressor 61 toward the gasification unit 14, and a booster 68 is connected to an intermediary point of the compressed air feeding line 41. Therefore, the fuel gas supplied from the gas purification unit 16 is mixed with the compressed air supplied from the compressor 61, and become combusted so that the combustion gas is produced in the combustor 62, and the produced combustion gas is supplied to the turbine 63. The turbine 63 then drives the generator 19 in rotation by driving the rotational shaft 64 in rotation, with the combustion gas supplied thereto.

The steam turbine unit 18 includes a turbine 69 that is coupled to the rotational shaft 64 of the gas turbine unit 17, and the generator 19 is coupled to the base end of the rotational shaft 64. A flue gas line 70 from the gas turbine unit 17 (the turbine 63) is connected to a heat recovery steam generator 20, and the heat recovery steam generator 20 produces steam by allowing the high-temperature flue gas to exchange heat with water supplies thereto. The heat recovery steam generator 20 is provided with a steam feeding line 71 between the turbine 69 of the steam turbine unit 18 and the heat recovery steam generator 20, and is also provided with a steam recovery line 72. A condenser 73 is provided to the steam recovery line 72. The steam produced in the heat recovery steam generator 20 may include the steam having exchanged heat with the raw syngas in a heat exchanger included in the gasification unit 14, and then having exchanged heat again in the heat recovery steam generator 20. Therefore, in the steam turbine unit 18, the steam supplied from the heat recovery steam generator 20 drives the turbine 69 in rotation, to cause the rotational shaft 64 to be rotated, and to drive the generator 19 in rotation.

After heat is recovered by the heat recovery steam generator 20, a gas scrubber 74 removes toxic substances from the resultant flue gas, and the cleaned flue gas is emitted to the atmosphere via a stack 75.

An operation of the integrated coal gasification combined cycle 10 according to the embodiment will now be explained.

In the integrated coal gasification combined cycle 10 according to the embodiment, raw coal (coal) is supplied into the coal feeder 11, and the coal feeder 11 mills the coal into fine powder that is the pulverized coal. The pulverized coal produced in the coal feeder 11 is carried by the nitrogen supplied from the air separator 42 through the first nitrogen feeding line 43, and is supplied into the gasification unit 14. The char recovered in the char recovery unit 15, which will be described later, is also carried by the nitrogen supplied from the air separator 42 through the second nitrogen feeding line 45, and into the gasification unit 14. The compressed air bled from the gas turbine unit 17, which will be described later, is boosted by the booster 68, and is supplied into the gasification unit 14 through the compressed air feeding line 41, together with the oxygen supplied from the air separator 42.

In the gasification unit 14, the supplied pulverized coal and char are combusted with the compressed air (oxygen), and the pulverized coal and the char gasify to produce the combustible gas (raw syngas). The combustible gas is then discharged from the gasification unit 14 through the gas production line 49, and is sent to the char recovery unit 15.

In the char recovery unit 15, the combustible gas is, to begin with, supplied into the precipitator 51, and the precipitator 51 separates the fine char particles contained in the combustible gas. The combustible gas having char separated is then sent into the gas purification unit 16 through the gas discharge line 54. The fine char particles separated from the combustible gas are discharged into the char bin (char storage unit) 52, accumulated in the supply hopper 53 via the char bin 52, and is recycled to the gasification unit 14 via the char return line 46.

The gas purification unit 16 then purifies the gas by removing impurities such as sulfur compounds and nitrogen compounds from the combustible gas having the char separated by the char recovery unit 15, to produce fuel gas. In the gas turbine unit 17, the compressor 61 produces the compressed air and supplies the compressed air to the combustor 62, and the combustor 62 mixes the compressed air supplied from the compressor 61 with the fuel gas supplied by the gas purification unit 16, and combusts the fuel gas, to produce the combustion gas. The combustion gas then drives the turbine 63 in rotation, causing the turbine 63 to drive the generator 19 in rotation via the rotational shaft 64, so that power is generated thereby.

In the gas turbine unit 17, the heat recovery steam generator 20 produces steam by allowing exhaust gas discharged from the turbine 63 to exchange heat with the water supplied thereto, and supplies the produced steam into the steam turbine unit 18. The steam turbine unit 18 can generate power by causing the steam supplied from the heat recovery steam generator 20 to drive the turbine 69 in rotation, and causing the generator 19 to be driven in rotation via the rotational shaft 64.

In the gas scrubber 74, toxic substances are removed from exhaust gas discharged from the heat recovery steam generator 20, and cleaned flue gas is emitted to the atmosphere via the stack 75.

Figure 2:
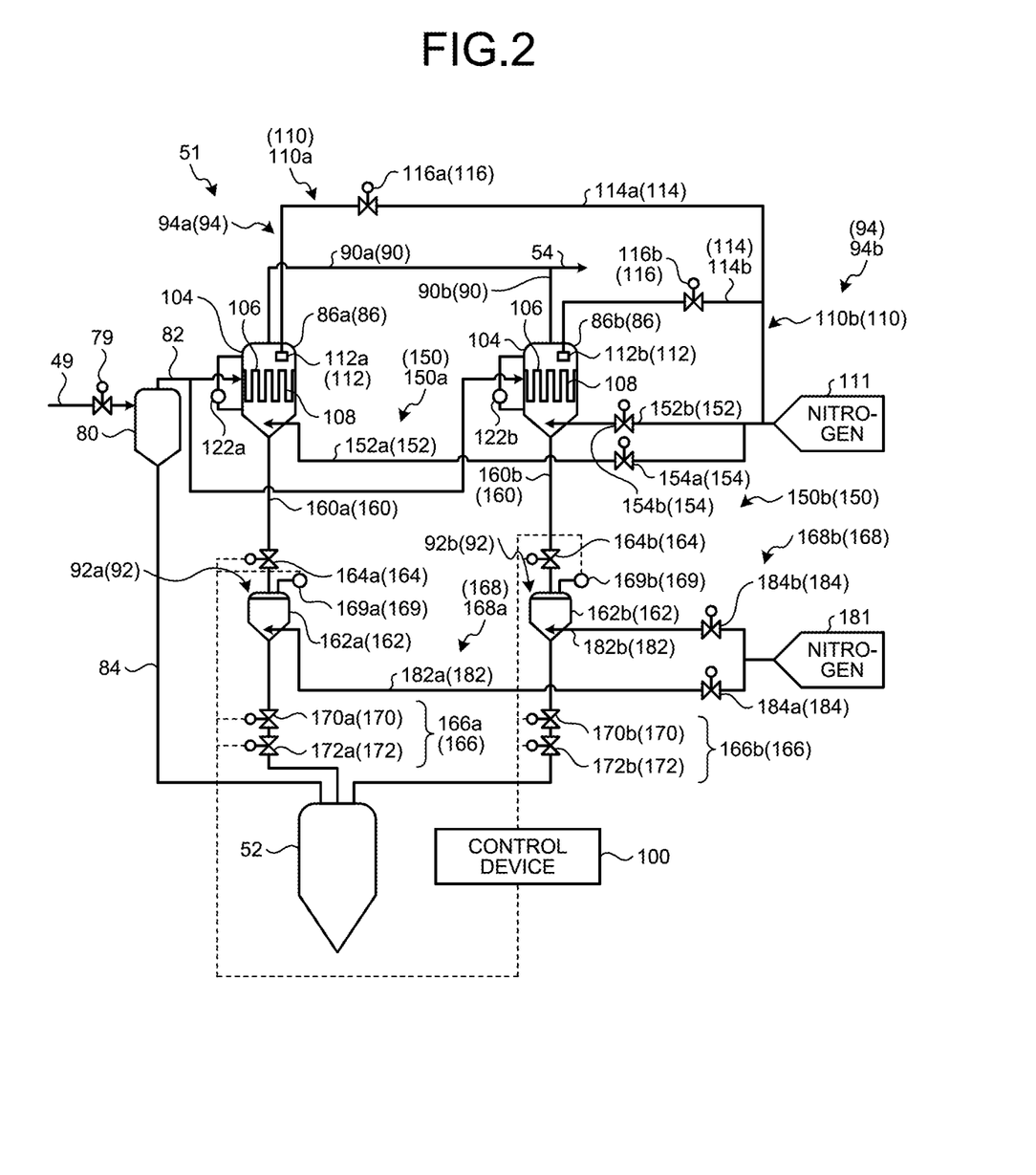
FIG. 2 is a schematic of a general configuration of a char recovery unit including a char discharge unit according to the embodiment.
Figure 3:
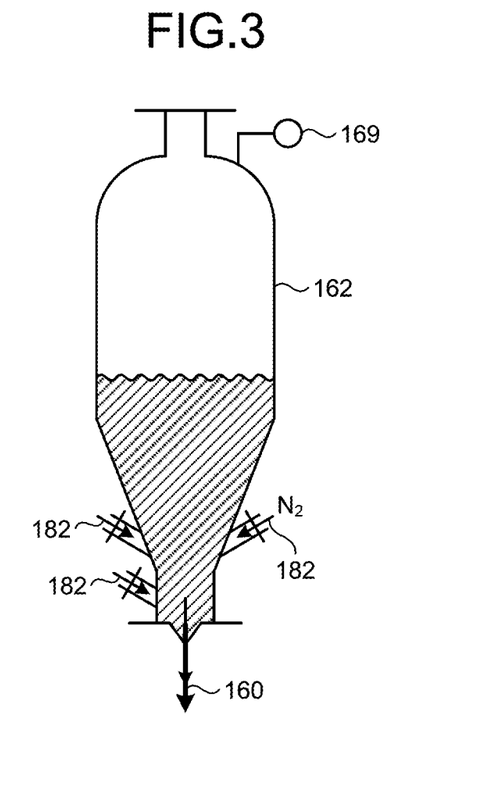
FIG. 3 is a cross-sectional view illustrating a general configuration of a lock hopper.

The char recovery unit 15 will now be explained in detail using FIGS. 2 and 3, in addition to FIG. 1. FIG. 2 is a schematic of a general configuration of a char recovery unit including a char discharge unit according to the embodiment. FIG. 3 is a cross-sectional view illustrating a general configuration of the lock hopper.

The char recovery unit 15 includes, as mentioned earlier, the precipitator 51, the char bin 52, the supply hopper 53, and the char return line 46. The char bin 52 is a container storing therein the char discharged (supplied) from the precipitator 51. The supply hopper 53 is a container for storing therein the char supplied from the char bin 52. The supply hopper 53 supplies the stored char into the gasification unit 14 via the char return line 46. In the embodiment, the supply hopper 53 is provided singly, but may be provided in plurality. In other words, the char bin 52 may supply the temporarily stored char into a plurality of supply hoppers 53.

The precipitator 51 will now be explained. The gas production line 49 is connected to the precipitator 51. The precipitator 51 is supplied with the raw syngas produced in the gasification unit 14 via the gas production line 49. The gas production line 49 is provided with a control valve 79. The control valve 79 controls supplying the combustible gas from the gasification unit 14 into the precipitator 51. The precipitator 51 includes a cyclone 80, two filtration units 86a, 86b, char discharge units 92a, 92b, and filter backwash units 94a, 94b. Each of these units included in the char recovery unit 15 is connected to a line through which the combustible gas or the char flows. As such lines, the char recovery unit 15 is provided with combustible gas lines 82, 90a, 90b, and a char recovery line 84. A char discharge unit 92a connects the filtration unit 86a and the char bin 52. A char discharge unit 92b connects the filtration unit 86b and the char bin 52.

The cyclone 80 is a primary precipitator that is connected to the gas production line 49, and separates char from the combustible gas supplied from the gas production line 49. As the cyclone 80, various types of device for separating char using the flow of combustible gas may be used. The cyclone 80 separates the char contained in the combustible gas using centrifugation, for example. The combustible gas line 82 connects the cyclone 80 and the two filtration units 86a, 86b. The char recovery line 84 connects the cyclone 80 and the char bin 52. The combustible gas having the char separated is supplied to the combustible gas line 82, and the char separated from the combustible gas is supplied into the char recovery line 84.

The filtration units 86a, 86b are secondary precipitators that are connected to the combustible gas lines 82, and that separate the char from the combustible gas supplied from the combustible gas lines 82 and having the char primarily separated by the cyclone 80. In the precipitator 51, coarser dust is collected with the cyclone 80, and finer dust is collected with the filtration units 86a, 86b. The combustible gas line 82, the char discharge unit 92a, and the combustible gas line 90a are connected to the filtration unit 86a. The char discharge unit 92a connects the filtration unit 86a to the char bin 52. The combustible gas line 90a connects the filtration unit 86a to the gas discharge line 54. The combustible gas line 82, the char discharge unit 92b, and the combustible gas line 90b are connected to the filtration unit 86b. The char discharge unit 92b connects the filtration unit 86b to the char bin 52. The combustible gas line 90b connects the filtration unit 86b to the gas discharge line 54. The only difference between the filtration units 86a, 86b is their layout, so hereinafter, the filtration units 86a, 86b will be referred to as a filtration unit 86 when the filtration units 86a, 86b are collectively explained. In the same manner, because the only difference between the char discharge units 92a, 92b is their layout, the char discharge units 92a, 92b will be referred to as a char discharge unit 92 when the filtration units 86a, 86b are collectively explained. Furthermore, the same applies to the elements connected to the filtration unit 86 and the char discharge unit 92, unless it is required to distinguish one from the other.

The filtration unit 86 is a filter using porous filter elements, and includes a container 104, a partitioning plate 106, and a large number of elements 108. The container 104 is sealed, except for the lines via which the char or the combustible gas is supplied or discharged. The combustible gas line 82, the char discharge unit 92, and the combustible gas line 90 are connected to the container 104. The partitioning plate 106 is disposed inside the container 104, and separates the container 104 into two spaces. The partitioning plate 106 according to the embodiment separates the internal space of the container 104 into an upper section in the vertical direction, and a lower section in the vertical direction. The combustible gas line 82 and the char discharge unit 92 are connected to the lower section of the container 104 that is on the lower side of the partitioning plate 106 in the vertical direction. The combustible gas line 90 is connected to the upper section of the container 104 that is on the upper side of the partitioning plate 106 in the vertical direction. A plurality of circular holes are formed on the partitioning plate 106. The elements 108 are inserted into the respective circular holes formed on the partitioning plate 106. Each of the elements 108 is a tube having a hollow inside (e.g., cylindrical tube), and has a shape having a bottom that closes the end of the tube, on a side away from the partitioning plate 106. The element 108 according to the embodiment has an upper end, being upper in the vertical direction, supported by the partitioning plate 106, and is arranged in a direction protruding downwardly from the partitioning plate 106 in the vertical direction. Because the elements 108 close the circular holes of the partitioning plate 106, in order for the gas to travel from the lower section that is on the lower side of the partitioning plate 106 in the container 104 to the upper section that is on the upper side of the partitioning plate 106 in the container 104, being upper and lower in the vertical direction, the gas needs to go through the elements 108. The elements 108 are members enabled to collect dust such as char contained in the combustible gas, by letting the combustible gas to pass therethrough.

In the filtration unit 86, the combustible gas supplied via the combustible gas line 82 passes through the elements 108, and discharged into the combustible gas line 90. The elements 108 collect the dust such as char (substances, fine particles) contained in the combustible gas passing therethrough. The dust is collected and accumulated on upstream surface of the elements 108, being upstream in the direction of the combustible gas flow, that is, the surface on the side to which the combustible gas line 82 is connected. In the filtration unit 86, filter backwash units 94a, 94b, which will be described later, discharge the dust collected by and accumulated on the elements 108 into the char discharge unit 92, by peeling off the dust from the elements 108.

The number of systems of the filtration units 86 is not limited to two, and the filtration unit 86 may include three or more systems. Furthermore, a bridge breaker unit 150 (150a, 150b) is disposed in the filtration unit 86 (86a, 86b). The bridge breaker unit 150 includes a nitrogen supply source 111, a nitrogen feeding line 152 (152a, 152b), and a control valve 154 (154a, 154b). The nitrogen supply source 111 supplies nitrogen. Supplied in the embodiment is nitrogen, but any inert gas not affecting the combustible gas nor the char may be used. One end of the nitrogen feeding line 152 is connected to the nitrogen supply source 111, and the other end is connected to a section of the filtration unit 86 on the side to which the char discharge unit 92 is connected, with respect to the elements 108. In other words, the nitrogen feeding line 152 is connected to the section upstream of the elements 108 in the direction of the combustible gas flow. The control valve 154 has opening and closing operations adjusted to control to start and stop the nitrogen supply from the nitrogen supply source 111 into the filtration unit 86.

In the bridge breaker unit 150, by causing the nitrogen supply source 111 to supply nitrogen into the filtration unit 86 via the nitrogen feeding line 152, the nitrogen is injected into the filtration unit 86. The nitrogen injected into the filtration unit 86 is sprayed onto the char accumulated inside the filtration unit 86. By striking the char accumulated inside the filtration unit 86 with the nitrogen, the bridge breaker unit 150 fluidizes the char accumulated inside the filtration unit 86, and promotes discharging of the char from the filtration unit 86 into the char discharge unit 92.

The char discharge unit 92a includes a char discharge line 160a, a lock hopper 162a, an admission valve 164a, a control valve 166a, a nitrogen supplying unit 168a, and an accumulated amount detector 169a. The control valve 166a includes a gate valve 170a and a dispensing valve 172a. The nitrogen supplying unit 168a includes a nitrogen feeding line 182a and a control valve 184a. In the same manner, the char discharge unit 92b includes a char discharge line 160b, a lock hopper 162b, an admission valve 164b, a control valve 166b, a nitrogen supplying unit 168b, and an accumulated amount detector 169b. The control valve 166b includes a gate valve 170b and a dispensing valve 172b. The nitrogen supplying unit 168b includes a nitrogen feeding line 182b and a control valve 184b. In the explanation hereunder, the char discharge units 92a, 92b will be collectively referred to as a char discharge unit 92. The char discharge unit 92a discharges char from the filtration unit 86a into the char bin 52, but because the pressure in the char bin 52 is higher than that in the filtration unit 86, it is necessary to transport the char out in the inverted pressure balance. In other words, because the cyclone 80 is directly connected to the char bin 52 via the char recovery line 84, the char discharge unit 92a is also required to prevent the char in the outlet of the cyclone 80 from flowing back into the filtration unit 86 via the char recovery line 84 and the char discharge line 160.

One end of the char discharge line 160 is connected to the filtration unit 86, and the other end is connected to the char bin 52. The lock hopper 162, the admission valve 164, and the control valve 166 are installed in the char discharge line 160. The lock hopper 162 is installed in the char discharge line 160, temporarily stores therein char discharged from the filtration unit 86, and discharges the stored char into the char bin 52. The lock hopper 162 is a container having an internal space for accumulating and storing therein char, as illustrated in FIG. 3. The lower end of the lock hopper 162 in the vertical direction is provided with a connected portion connected with the char discharge line 160 that is connected to the char bin 52. Specifically, the lock hopper 162 is disposed on the upper side of the char bin 52 in the vertical direction. A part of the char discharge line 160 connecting the lock hopper 162 to the char bin 52 is laid in an orientation allowing the char to fall from the lock hopper 162 into the char bin 52 due to the gravity. The lock hopper 162 discharges the char via the connected portion that is connected to the char discharge line 160 on the lower side in the vertical direction.

The admission valve 164 is disposed in the char discharge line 160 between the filtration unit 86 and the lock hopper 162. The admission valve 164 is switched to open and to close, to switch to supply and to stop supplying the char having discharged from the filtration unit 86 and having entered the char discharge line 160 into the lock hopper 162.

The control valve 166 is disposed in the char discharge line 160 between the lock hopper 162 and the char bin 52. The control valve 166 is switched to open or to close, to switch to supply and to stop supplying the char having discharged from the lock hopper 162 and having entered the char discharge line 160, into the char bin 52. The control valve 166 includes the gate valve 170 and the dispensing valve 172, as mentioned earlier. The gate valve 170 is switched to start and to stop the flow of the char through the char discharge line 160. As the gate valve 170, it is not necessary to use an air-tight valve if the valve can control the char flow. The dispensing valve 172 is disposed closer to the char bin 52 than the gate valve 170 is, and is switched to start and to stop the flow of gas through the char discharge line 160. The dispensing valve 172 is an air-tight valve.

The nitrogen supplying unit 168 supplies nitrogen into the lock hopper 162. The nitrogen supplying unit 168 includes a nitrogen supply 181, the nitrogen feeding line 182, and the control valve 184. The nitrogen supply 181 supplies nitrogen. Supplied in the embodiment is nitrogen, but any inert gas not affecting the combustible gas nor the char may be used. One end of the nitrogen feeding line 182 is connected to the nitrogen supply 181, and the other end is connected to the lock hopper 162. The nitrogen feeding line 182 according to the embodiment is disposed near a discharge port through which the char stored in the lock hopper 162 is discharged. An injection port leading nitrogen from the nitrogen feeding line 182 to the inside of the lock hopper 162 is disposed at an angle at which the nitrogen is injected to the discharge port. The control valve 184 has opening and closing operations adjusted to control to start and to stop supplying the nitrogen from the nitrogen supply 181 into the lock hopper 162.

In the nitrogen supplying unit 168, by causing the nitrogen supply source 181 to supply nitrogen into the lock hopper 162 through the nitrogen feeding line 182, the nitrogen is injected into the lock hopper 162, as illustrated in FIG. 3. The nitrogen injected into the lock hopper 162 strikes the char accumulated inside the lock hopper 162. By striking the char accumulated inside the lock hopper 162 with the nitrogen, the nitrogen supplying unit 168 fluidizes the char accumulated inside the lock hopper 162, and promotes discharging of the char from the lock hopper 162 into the char bin 52. Furthermore, when the char is accumulated, and bridging is formed inside the lock hopper 162, the nitrogen supplying unit 168 destroys the famed char bridging, and promotes discharging of the char from the lock hopper 162 into the char bin 52.

By supplying the nitrogen while the admission valve 164 and the control valve 166 are both closed, the nitrogen supplying unit 168 increases a pressure inside the lock hopper 162. In this manner, the pressure in the lock hopper 162 reaches the same level as that in the filtration unit 86, so that the lock hopper 162 can receive the char from the filtration unit 86.

The accumulated amount detector 169 detects the amount of char accumulated in the lock hopper 162. As the accumulated amount detector 169, a gamma-ray level meter or a load cell weighing scale may be used. The accumulated amount detector 169 sends the detection result to a control device 100.

The char discharge unit 92 supplies the char from the filtration unit 86 into the char bin 52 via the lock hopper 162 by switching between a configuration in which char is supplied from the filtration unit 86 into the lock hopper 162 and a configuration in which the char stored in the lock hopper 162 is supplied (discharged) into the char bin 52, by controlling the admission valve 164 and the control valve 166 (the gate valve 170 and the dispensing valve 172) to open and to close. A structure of the char discharge unit 92 will be described later.

The filter backwash unit 94a peels off the dust collected by/accumulated on the elements 108 in the filtration unit 86a, from the elements 108. The filter backwash unit 94a includes a gas injection unit 110a and a differential pressure gauge 122a. The filter backwash unit 94b peels off the dust collected by/accumulated on the elements 108 in the filtration unit 86b, from the elements 108. The filter backwash unit 94b includes a gas injection unit 110b and a differential pressure gauge 122b.

The gas injection unit 110a includes the nitrogen supply source 111, a nozzle 112a, a nitrogen feeding line 114a, and a control valve 116a. The gas injection unit 110b includes the nitrogen supply source 111, a nozzle 112b, a nitrogen feeding line 114b, and a control valve 116b. The nitrogen supply source 111 is shared between the gas injection unit 110a and the gas injection unit 110b. The gas injection unit 110a and the gas injection unit 110b have the same structure except that the gas injection unit 110a and the gas injection unit 110b are installed in the filtration unit 86a and the filtration unit 86b, respectively. Therefore, these elements will be explained as a gas injection unit 110, a nozzle 112, a nitrogen feeding line 114, and a control valve 116. Furthermore, in the explanation of the embodiment, the nitrogen supply source 111 also serves as the nitrogen supply source 111 that is shared with the bridge breaker unit 150, but the present invention is not limited thereto.

The nozzle 112 is disposed downstream of the elements 108 in the direction of the combustible gas flow, that is, on the side of the combustible gas line 90, in the filtration unit 86. In other words, the nozzle 112 is disposed on the side where a surface of the elements 108 is exposed, the surface being on the opposite side of the surface on which the dust, such as the char contained in the combustible gas and collected and accumulated on the elements 108, becomes attached. The nozzle 112 is provided singly or in plurality for one filtration unit 86. The nitrogen feeding line 114 connects the nitrogen supply source 111 and the nozzle 112. The control valve 116 has opening and closing operations adjusted to control to start and to stop the nitrogen supply from the nitrogen supply source 111 into the nozzle 112.

In the gas injection unit 110, the nitrogen supply source 111 supplies nitrogen into the nozzle 112 via the nitrogen feeding line 114, and the nozzle 112 injects the nitrogen to the elements 108. The nitrogen injected from the nozzle 112 strikes the elements 108. By striking the elements 108 with the nitrogen from the downstream side of the elements 108 in direction of the combustible gas flow, the gas injection unit 110 removes the dust attached and accumulated on the upstream side of the elements 108, being upstream in the direction of the combustible gas flow, and allows the dust to fall off from the surface of the elements 108. The differential pressure gauge 122a is installed in the filtration unit 86a. The differential pressure gauge 122a detects the pressure difference between the upstream section and the downstream section, with respect to the elements 108 included in the filtration unit 86a. The differential pressure gauge 122b detects the pressure difference between the upstream section and the downstream section, with respect to the elements 108 included in the filtration unit 86b.

The char recovery unit 15 also includes a control device 100. The control device 100 controls the operations of the elements included in the char recovery unit 15. The control device 100 also serves as a control device for the char discharge unit 92.

Figure 4:
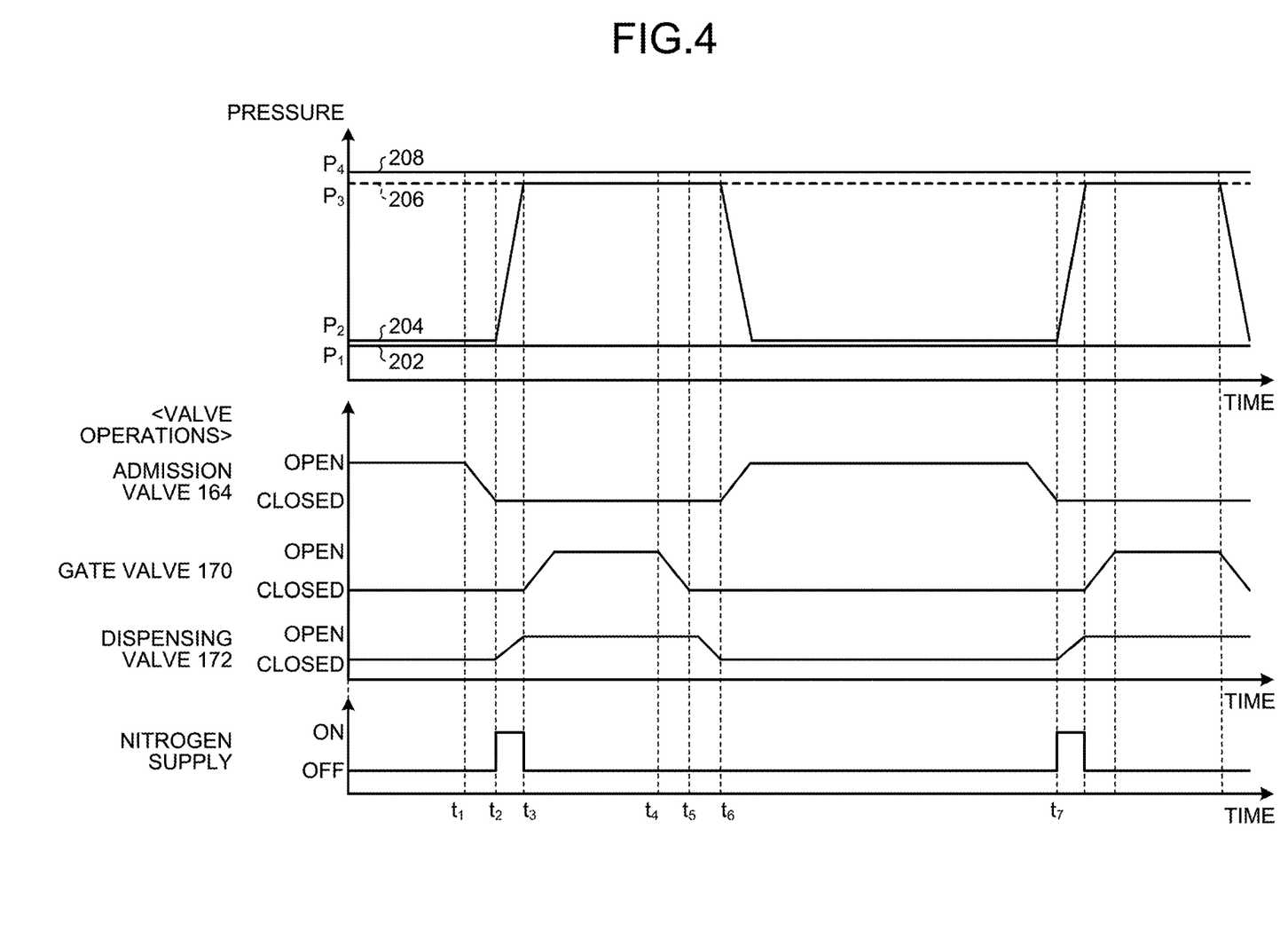
FIG. 4 is a time chart illustrating an exemplary operation of the char discharge unit.

An exemplary operation of the char discharge unit 92 included in the char recovery unit 15, that is, a char discharge method performed by the char discharge unit 92 will now be explained with reference to FIG. 4. FIG. 4 is a time chart illustrating an exemplary operation of the char discharge unit. Illustrated in the example in FIG. 4 are timing of pressure changes in the lock hopper 162, opening and closing of the admission valve 164, opening and closing of the gate valve 170, opening and closing of the dispensing valve 172, and ON and OFF of nitrogen supply from the nitrogen supplying unit 168. In FIG. 4, a line 202 representing a pressure indicates the pressure in the filtration unit 86. A line 204 indicates the pressure in the lock hopper 162. A line 206 indicates the pressure in the char bin 52. A line 208 indicates the pressure in the cyclone 80. These pressures $P_1$, $P_2$, $P_3$, and $P_4$ are in a relation $P_1<P_2<P_3<P_4$. On the left side of the paper surface in FIG. 4 (near the point of origin of time), the pressure of the filtration unit 86 is at the pressure $P_1$, as indicated by the line 202. The pressure of the char bin 52 is at the pressure $P_3$, as indicated by the line 206. The pressure in the cyclone 80 is at the pressure $P_4$, as indicated by the line 208. Because the filtration unit 86 is positioned downstream of the cyclone 80, the pressure in the filtration unit 86 is lower than that in the cyclone 80. Because the cyclone 80 is directly connected to the char bin 52 via the char recovery line 84, the char at the outlet of the cyclone 80 will go back into the filtration unit 86 via the char recovery line 84 and the char discharge line 160, unless the pressure of the lock hopper 162 is changed, and the admission valve 164, the gate valve 170, and the dispensing valve 172 are opened and closed, at appropriate timing.

The process illustrated in FIG. 4 can be achieved by causing the control device 100 to operate these elements. At the initial timing at which the control illustrated in FIG. 4 is started, the admission valve 164 is open, and the gate valve 170 and the dispensing valve 172 are closed. In this configuration, the char collected by the filtration unit 86 is supplied into the lock hopper 162, and the amount of char accumulated in the lock hopper 162 increases. The control device 100 causes the accumulated amount detector 169 to keep detecting the amount of char accumulated in the lock hopper 162.

When the accumulated amount detector 169 detects that the amount of char accumulation is full, that is, the amount is equal to or more than a first threshold at time $t_1$, the control device 100 starts an operation of closing the admission valve 164. In the char discharge unit 92, the admission valve 164, the gate valve 170, and the dispensing valve 172 then become all closed at time $t_2$. Once the admission valve 164, the gate valve 170, and the dispensing valve 172 are all closed at time $t_2$, the control device 100 starts an operation of opening the dispensing valve 172, and causes the nitrogen supplying unit 168 to start supplying nitrogen into the lock hopper 162. In the lock hopper 162, by receiving the supply of nitrogen with the admission valve 164 and the gate valve 170 closed, the pressure in the lock hopper 162 become increased from the pressure $P_2$ that is closer to the pressure in the filtration unit 86, to the pressure $P_3$ that is closer to the pressure in the cyclone 80 and is equal to the pressure in the char bin 52. In the embodiment, the dispensing valve 172 is opened and the nitrogen supplying unit 168 is caused to start supplying nitrogen at the same timing, but alternatively, the nitrogen supplying unit 168 may start supplying nitrogen precedently, and the dispensing valve 172 may then be opened after the pressure is increased. The dispensing valve 172 is an air-tight valve, and the dispensing valve 172 is opened before the gate valve 170 is opened, in a condition in which no char is moving. Therefore, it is possible to suppress the reduction of the sealing property of the dispensing valve 172, due to char becoming attached to or damaging the valve seat of the dispensing valve 172.

In the char discharge unit 92, the pressure in the lock hopper 162 reaches the pressure $P_3$, and the dispensing valve 172 is opened, at time $t_3$, while the admission valve 164 and the gate valve 170 are closed. When the admission valve 164 is closed, a part of the char collected with the filtration unit 86 becomes temporarily stored in the lower section of the filtration unit 86. Once the condition at time $t_3$ is achieved, the control device 100 starts an operation of opening the gate valve 170. In the char discharge unit 92, once the gate valve 170 is opened, the gate valve 170 and the dispensing valve 172 both become open, and the char stored in the lock hopper 162 is discharged into the char bin 52. In the char discharge unit 92, the lock hopper 162 is disposed on the upper side of the char bin 52 in the vertical direction, and the char discharge line 160 is connected on the lower side of the lock hopper 162 in the vertical direction. Therefore, the char becomes discharged into the char bin 52 due to the gravitational force.

When the control device 100 determines, with the accumulated amount detector 169, that the char stored in the lock hopper 162 has been completely discharged, that is, determines that the level of the char becomes equal to or less than a second threshold (where the second threshold is a value smaller than the first threshold), for example, the control device 100 ends the process of discharging the char from the lock hopper 162 into the char bin 52. Specifically, as illustrated at time $t_4$, the control device 100 starts an operation of closing the gate valve 170. At time $t_5$, the control device 100 controls the gate valve 170 and the admission valve 164 to close, and the dispensing valve 172 to open. Once the gate valve 170 and the admission valve 164 are closed while the dispensing valve 172 is open, as illustrated at time $t_5$, the control device 100 then starts an operation of closing the dispensing valve 172. Once the admission valve 164, the gate valve 170, and the dispensing valve 172 are all closed, as illustrated at time $t_6$, the control device 100 then starts an operation of opening the admission valve 164. By opening the admission valve 164, the nitrogen gas filled inside the lock hopper 162 is discharged into the filtration unit 86, and the pressure in the lock hopper 162 drops to the pressure $P_1$. In the char discharge unit 92, by achieving a configuration in which the admission valve 164 is open, while the gate valve 170 and the dispensing valve 172 are closed, the char starts being discharged from the filtration unit 86 into the lock hopper 162. The dispensing valve 172 is an air-tight valve, and the dispensing valve 172 is closed after the gate valve 170 is closed, in a condition in which no char is moving. Therefore, it is possible to suppress the reduction of the sealing property at the valve seat of the dispensing valve 172. In the char discharge unit 92, the char is accumulated in the lock hopper 162, and, when the control device 100 determines, with the accumulated amount detector 169, that the amount of char accumulation is full, that is, the amount is equal to or more than the first threshold at time $t_7$, the control device 100 executes the same process as that performed between time $t_1$ and time $t_6$ explained above.

Conventionally, a rotary feeder (rotary valve not illustrated) is installed in the char discharge line 160 so that char is discharged without causing any char backflow even in the inverted pressure balance, in which the pressure of the char discharge line 160 is lower than that in the char recovery line 84 leading from the outlet of the cyclone 80. Such a rotary feeder has a rotatable part on which the char from the filtration unit 86 is retained, and, when such a part for retaining the char becomes connected to one of the filtration unit 86 and the char bin 52, the part becomes separated from the other. In this manner, with the rotary feeder, the char is supplied from the filtration unit 86 into the char bin 52 in a batch, without directly connecting the filtration unit 86 and the char bin 52. However, the rotary feeder requires such a sliding rotating portion to be always sealed, and the rotary feeder sometimes falls incapable of suppressing leakage of internal gas when the char becomes stuck, and reduces the sealability. In such a case, a maintenance repair of the rotary feeder may be required.

As described above, in the char discharge unit 92, the lock hopper 162 is provided to the char discharge line 160; the admission valve 164 is provided to the char discharge line 160 on the side of the filtration unit 86 with respect to the lock hopper 162; and the control valve 166 (the gate valve 170 and the dispensing valve 172) is provided to the char discharge line 160 on the side of the char bin 52 with respect to the lock hopper 162. In the char discharge unit 92, by opening the admission valve 164 and closing the control valve 166, it is possible to shut down the section between the lock hopper 162 and the char bin 52 while leaving the section between the lock hopper 162 and the filtration unit 86 open. In this manner, the char in the filtration unit 86 can be supplied into the lock hopper 162 while preventing the flow of gas between the lock hopper 162 and the char bin 52. In the char discharge unit 92, by closing the admission valve 164 and opening the control valve 166, it is possible to open the channel between the lock hopper 162 and the char bin 52 while the channel between the lock hopper 162 and the filtration unit 86 is closed. In this manner, the char in the lock hopper 162 can be supplied into the char bin 52 while preventing the flow of gas between the lock hopper 162 and the filtration unit 86. Based on the above, by switching to open one of the admission valve 164 and the control valve 166 and to close the other, the char discharge unit 92 can switch the position where any one point between the outlet of the filtration unit 86 and the inlet of the char bin 52 is sealed, through the operations of opening and closing valves. In this manner, the sealability can be maintained without using any structure in which the sealed portion constantly operates, unlike the conventional structure including a rotary feeder (rotary valve). In this manner, char can be discharged highly reliably, while maintaining the sealability between the filtration unit 86 and the char bin 52. Hence, it is possible to discharge the char from the filtration unit 86 into the char bin stably, and to reduce the frequency of maintenance.

In the char discharge unit 92, after the discharge of char from the filtration unit 86 into the lock hopper 162 is completed, and before the char starts being supplied from the lock hopper 162 into the char bin 52, the nitrogen supplying unit 168 is caused to supply nitrogen into the lock hopper 162 to increase the pressure in the lock hopper 162 to the same level as that in the char bin 52. In this manner, it is possible to suppress generation of a gas flow in a direction from the char bin 52 to the lock hopper 162. In this manner, it is possible to suppress backflow and movement of the char through the char discharge line 160 into the lock hopper 162, and to suppress scattering of char in the lock hopper 162 and the char bin 52 resulting from the backward movement of gas. In this manner, char can be discharged efficiently from the lock hopper 162 into the char bin 52. Furthermore, the nitrogen supplying unit 168 can also serve as a bridge breaker unit for suppressing char clogging in the lock hopper 162. In this manner, because the char discharge unit 92 is provided with the nitrogen supplying unit 168, it is possible to adjust the pressure in the lock hopper 162, and to prevent char clogging in the lock hopper 162.

The char discharge unit 92 uses the two control valves 166, one of which is the gate valve 170 that controls discharging of the char, and the other of which is the dispensing valve 172 that is disposed closer to the char bin 52 than the gate valve 170 is, and that controls gas flow. Therefore, the dispensing valve 172, which controls the gas flow, can be opened and closed without any char moving around the dispensing valve 172. In this manner, it is possible to suppress the reduction of the sealability of the dispensing valve 172 that ensures the sealability, due to the char becoming attached to or damaging the valve seat. In this manner, higher sealability can be maintained, and the reduction of the performance as an air-tight valve can be suppressed.

Furthermore, the lower end of the lock hopper 162 is connected to the char discharge line 160 that is connected to the char bin 52 in the vertical direction; the lock hopper 162 is disposed on the upper side of the char bin 52 in the vertical direction; and a portion of the char discharge line 160 via which the lock hopper 162 and the char bin 52 are connected is arranged in an orientation allowing the char to fall from the lock hopper 162 into the char bin 52 due to the gravity. In this manner, it is possible to discharge the char into the char bin 52 using the gravitational force. Therefore, despite the powder diameter of the char is relatively small, the char collected with the filtration unit 86 that is the secondary precipitator can be carried into the char bin 52 efficiently. Because the small diameter char stored in the lock hopper 162 does not fluidize very easily, it is effective to transport the char using the gravitational force, as disclosed in the embodiment.

In the char discharge unit 92 according to the embodiment, one lock hopper 162 is provided for one filtration unit 86, but a plurality of lock hoppers 162 may be provided for one filtration unit 86. At least one lock hopper 162 is provided for one filtration unit 86.

It is preferable for the control device 100 to correct the amount of char accumulation that is calculated based on the detection result of the accumulated amount detector 169, based on various types of observation information. In this manner, the control device 100 can calculate the amount of char accumulation more accurately, so that a larger amount of char can be stored, while excessive storage of the char in the lock hopper 162 is suppressed. In this manner, char can be discharged from the lock hopper 162 more efficiently.

Furthermore, in the embodiment described above, the char discharge unit 92 is explained as that for the char recovery unit 15 included in the integrated coal gasification combined cycle 10, but the char discharge unit 92 may be used in any plants other than the integrated coal gasification combined cycle 10, e.g., as a char discharge unit for a char recovery unit included in a chemical plant.

REFERENCE SIGNS LIST 10 integrated coal gasification combined cycle (integrated gasification combined cycle)
11 coal feeder
11a coal feeding line
14 gasification unit
15 char recovery unit
16 gas purification unit
17 gas turbine unit
18 steam turbine unit
19 generator 20 heat recovery steam generator
41 compressed air feeding line
42 air separator
43 first nitrogen feeding line
45 second nitrogen feeding line
46 char return line
47 oxygen feeding line
49 gas production line
51 precipitator
52 char bin (char storage unit)
53 supply hopper
54 gas discharge line
61 compressor
62 combustor
63 turbine
64 rotational shaft
65 compressed air feeding line
66 fuel gas feeding line
67 combustion gas feeding line
68 booster
69 turbine
70 flue gas line
71 steam feeding line
72 steam recovery line
74 gas scrubber
75 stack
79 control valve
80 cyclone
82, 90a, 90b combustible gas line
84 char recovery line
86, 86a, 86b filtration unit
92, 92a, 92b char discharge unit
94a, 94b filter backwash unit
100 control device
104 container
106 partitioning plate
108 element
110, 110a, 110b gas injection unit
111, 181 nitrogen supply source
112, 112a, 112b nozzle
114, 114a, 114b nitrogen feeding line
116, 116a, 116b control valve
122a, 122b differential pressure gauge
150, 150a, 150b bridge breaker unit
152, 152a, 152b nitrogen feeding line
154, 154a, 154b control valve
160, 160a, 160b char discharge line
162, 162a, 162b lock hopper
164, 164a, 164b admission valve
166, 166a, 166b control valve
168, 168a, 168b nitrogen supplying unit
169, 169a, 169b accumulated amount detector
170, 170a, 170b gate valve
172, 172a, 172b dispensing valve
182, 182a, 182b nitrogen feeding line
184, 184a, 184b control valve

The invention claimed is:

1. A char discharge unit for discharging char discharged from a filtration unit into a char storage unit in which a pressure is at least temporarily higher pressure than that in the filtration unit, the char discharge unit comprising:
  a char discharge line connected to a lower side of the filtration unit in a vertical direction and connected to the char storage unit;
  a lock hopper installed at an intermediary point of the char discharge line to temporarily store the char;
  an admission valve installed in the char discharge line between the lock hopper and the filtration unit;
  a control valve installed in the char discharge line between the lock hopper and the char storage unit; and
  a control device configured to close the control valve when the admission valve is open, and to close the admission valve when the control valve is open, wherein
  the control valve includes
  a gate valve configured to switch between starting and stopping a flow of the char through the char discharge line; and
  a dispensing valve disposed closer to the char storage unit than the gate valve to switch sealing gas inside the char discharge line.

2. The char discharge unit according to claim 1, wherein the lock hopper is disposed above the char storage unit in the vertical direction, and
  a part of the char discharge line connecting the lock hopper and the char storage unit is laid in an orientation allowing the char to fall from the lock hopper into the char storage unit due to gravity.

3. The char discharge unit according to claim 1, further comprising an inert gas supplying unit configured to supply inert gas into the lock hopper, wherein
  to start discharging of the char from the lock hopper into the char storage unit, the control device closes the control valve and the admission valve and causes the inert gas supplying unit to supply inert gas into the lock hopper so that a pressure inside the lock hopper becomes a same level as a pressure inside the char storage unit, and then opens the control valve.

4. The char discharge unit according to claim 1, wherein
  to start discharging of the char from the lock hopper into the char storage unit, the control device opens the dispensing valve and then opens the gate valve, and
  to stop discharging of the char from the lock hopper into the char storage unit, the control device closes the gate valve and then closes the dispensing valve.

5. A char recovery unit comprising:
  a cyclone configured to separate at least a part of char from combustible gas produced in a gasification unit;
  a filtration unit configured to collect the char contained in the combustible gas having passed through the cyclone;
  a char storage unit configured to store the char collected with the cyclone and the filtration unit;
  the char discharge unit according to claim 1 to discharge the char collected with the filtration unit into the char storage unit; and
  a char return line for supplying the char stored in the char storage unit into the gasification unit.

6. An integrated gasification combined cycle comprising:
  a gasification unit configured to combust and gasify carbonaceous feedstock to produce raw syngas;
  the char recovery unit according to claim 5 to recover char from combustible gas discharged from the gasification unit;
  a gas turbine configured to be driven in rotation by combusting at least a part of the combustible gas produced by the gasification unit and having passed through the char recovery unit;
  a steam turbine configured to be driven in rotation by steam produced by a heat recovery steam generator into which turbine flue gas discharged from the gas turbine is introduced; and a generator coupled to the gas turbine and the steam turbine.

* * * * *